May 28, 1968     K. J. SCOWEN     3,385,546
HEADLAMP ADJUSTING DEVICE
Filed May 31, 1966
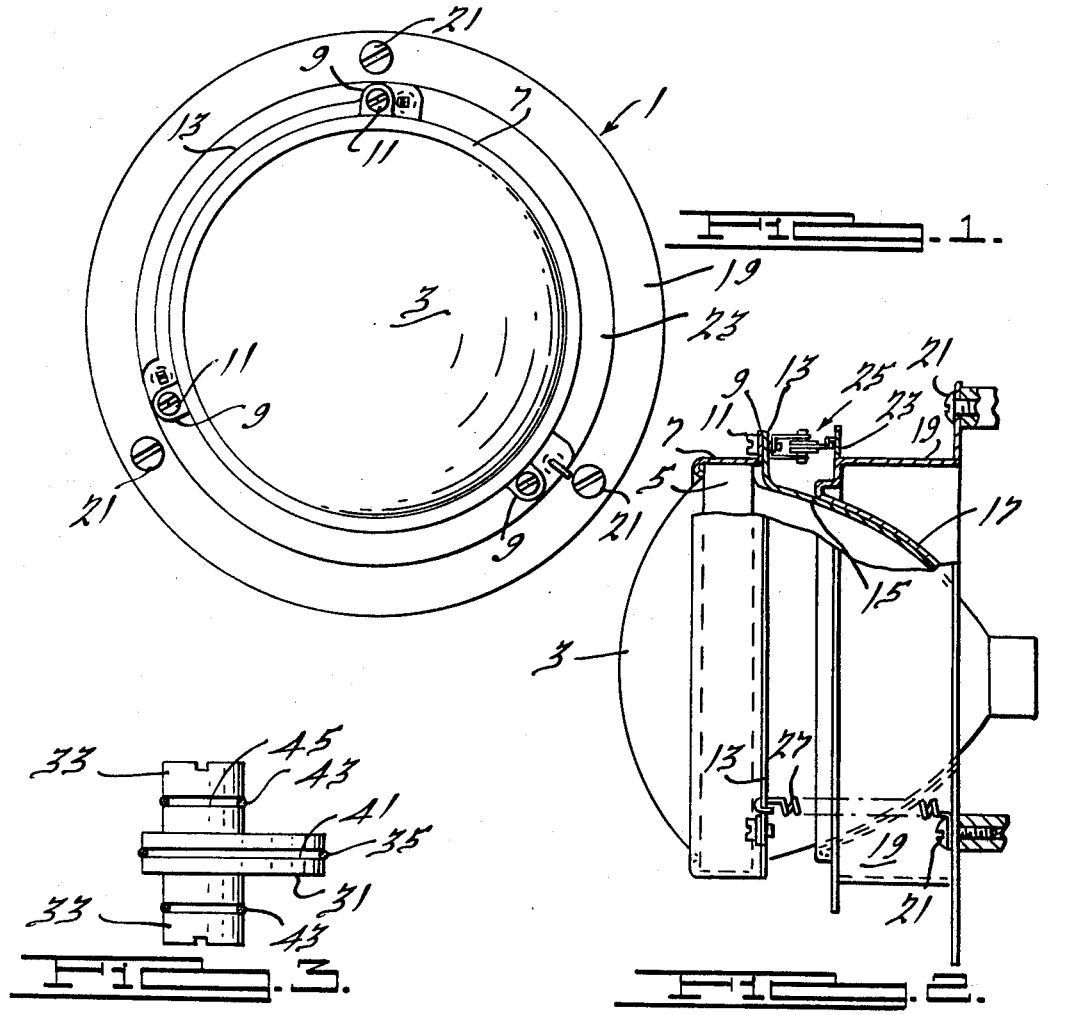
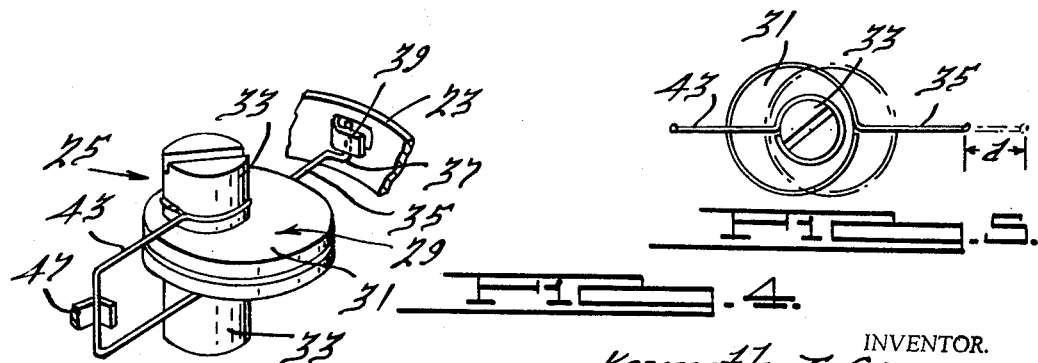
INVENTOR.
Kenneth J. Scowen
BY
Harness and Harris
ATTORNEYS.

3,385,546
HEADLAMP ADJUSTING DEVICE
Kenneth J. Scowen, Royal Oak, Mich., assignor to Chrysler Corporation, Highland Park, Mich., a corporation of Delaware
Filed May 31, 1966, Ser. No. 554,168
8 Claims. (Cl. 248—205)

ABSTRACT OF THE DISCLOSURE

Headlamp adjusting device including an adjustable eccentric mechanism located between a headlamp and a support, a first wire connector joining a shaft of the eccentric to the headlamp, and a second wire connector joining the eccentric sheave to the support. Rotation of the shaft shortens or lengthens the effective length of the mechanism to adjust the distance between the headlamp and the support.

---

This invention relates to lamp adjustment devices, and more particularly to devices for adjusting the relationship between a lamp, such as an automotive headlamp, and a support for the lamp, such as the seating for an automotive headlamp.

An automotive headlamp is adjusted by varying the position of the headlamp and the retainer around it relative to a support or seating in which the lamp and retainer are held in a manner somewhat similar to a ball and socket joint. Conventionally, the adjustment is accomplished by the use of two adjusting screws which connect the retainer to the seating. One of the screws is located near the top of the lamp and retainer unit and the other is located on one side of the unit. A tension spring connects the retainer to the seating at a point across from and approximately equidistant from both screws. The headlamp is adjusted in a vertical direction by turning the top screw, and adjusted in a horizontal direction by turning the side screw. The spring maintains the retainer in contact with the screws as the latter are turned.

While the heretofore described method of adjustment is effective, it requires a substantial amount of time to perform. The headlamp door or bezel must first be removed to gain access to the adjustment screws. Moreover, to obtain a full 10° adjustment in a vertical or a horizontal direction it may be necessary to turn the adjusting screw as many as 14 turns to accomplish the adjustment. Thus, if it were necessary to make a 10° vertical adjustment and a 10° horizontal adjustment, the person making the adjustment would have to turn a screw driver as many as 28 turns to accomplish the complete adjustment. Inasmuch as it is often necessary to adjust the headlamps of an automobile to insure that the beams are directed at the correct angle, the time consumed in making such adjustments is of considerable importance.

Briefly, this invention comprises an eccentric mechanism locatable between the headlamp member and a support member, the eccentric mechanism including a shaft, and a sheave, and connectors adapted to join the shaft to one member and the sheave to another member, rotation of the eccentric mechanism causing the distance between the members to vary.

Accordingly, it is a principal object of this invention to provide an improved device for adjusting lamps with respect to their supports, and particularly automotive headlamps with respect to their supports.

Another object of this invention is the provision of an improved device of the class described which permits headlamp adjustment to be quickly and easily performed.

A further object of the present invention is the provision of a device for adjusting automotive headlamps which does not require removal of the headlamp door or bezel, but rather is readily accessible by a mechanic.

Still another object of the present invention is the provision of a device for adjusting automotive headlamps which is simple and economical in construction, yet effective in operation.

Other objects of the invention will be apparent as the description proceeds.

One embodiment of the invention is illustrated in the accompanying drawings, in which:

FIGURE 1 is a front view elevation of a headlamp assembly utilizing the devices of this invention:

FIGURE 2 is a side elevation of the apparatus shown in FIGURE 1;

FIGURE 3 is an enlarged side elevation of a device of this invention, certain parts being shown in section for clarity;

FIGURE 4 is an enlarged perspective view of one of the devices of this invention; and FIGURE 5 is a diagrammatic illustration of the adjustment range of a device of this invention.

Corresponding reference numerals indicate corresponding parts throughout the several views of the drawings.

Referring now to the drawings, a headlamp assembly is generally indicated at 1 in FIGURE 1. Assembly 1 includes a headlamp 3 having a flange portion 5 around which a retainer member 7 extends. Retainer 7 has a plurality of upstanding tabs 9 through which screws 11 extend for securing the retainer 7 to a peripheral flange 13 of a seating member 15. Seating member 15 extends rearwardly from the retainer 7 and is socketed in a shell 17. Shell 17 has extension members 19 through which bolts 21 pass for securing the shell to the frame of the automobile. An annular step surface 23 is provided between extension member 19 and shell 17 for purposes described hereafter.

Adjusting devices of this invention are indicated at 25 in FIGURE 2 and extend between flange 13 and step surface 23. These adjusting devices 25 are located in substantially the same position as the adjusting screws in the headlamp assemblies which were described previously, i.e., one device 25 at the top of the headlamp and another device at one side of the headlamp.

A tension spring 27 extends between flange 13 and a bolt 21 in extension member 19 at a point which is opposite the two adjusting mechanisms 25. The purpose of the tension spring 27 is to maintain tension on the adjusting devices 25 at all times.

Each device 25 comprises an eccentric mechanism 29 formed of a sheave 31 and laterally extending shaft portions 33 which are eccentrically located on the sheave 31. Sheave 31 is connected to step surface 23 by a wire connector 35 which at its rearward end is formed in the shape of a hook 37 engaged behind a clip 39 on step surface 23. The forward end of connector 35 is circular in shape, surrounds sheave 31 and rests in a peripheral groove 41 in the sheave. The connector 35 or groove 41 may be formed with serrations for providing a frictional grip between the connector and the sheave to prevent slipping due to vibration. The wire per se is also sprung over the sheave to exert a tight grip thereon. The device 25 is connected to flange 13 by a generally U-shaped wire connector 43. The rearward ends of the connector 43 are wrapped around and located in grooves 45 and shaft portions 33. The rearward ends of connector 43 and/or grooves 45 may also be serrated to provide a good grip between the connector and grooves for avoiding slippage therebetween. The connector 43 is hooked on a clip 47 which is secured to the flange 13.

The ends of the shaft portions 33 are shown as being slotted to receive or accept a screw driver or other tool for turning. However, the ends of the shaft portion could be formed in other configurations to accept other tools. It will be seen that by turning one of the shaft portions 33 the total length of the device may be lengthened and shortened along a substantially straight line, i.e., the distance between flange 13 and step surface 23 may be varied to adjust the position of the headlamp.

It is preferable that the devices 25 be installed on the headlamp in such a manner that they may be reached with a tool from the top, i.e. by reaching downwardly behind the grille for example, to perform any adjustments of the headlamp. In this manner, removal of the headlamp door or bezel is not necessary. The devices may be placed at any angle for adjustment convenience.

It has been found that with the use of the devices disclosed herein a full 10° adjustment may be made of the headlamp by only rotating the adjuster 180° or ½ turn. The total length of the device 25 may be varied by rotating the shaft portions 33 a predetermined amount. The total variation in length along a straight line of the device 25 is diagrammatically illustrated in FIGURE 5 by the distance $d$. It will thus be seen that the headlamp employing the devices of the present invention may be quickly and readily adjusted without requiring the removal of the headlamp door or bezel and without requiring any significant amount of time for adjustment.

The particulars of the foregoing description are provided merely for purposes of illustration and are subject to considerable latitude of modification without departing from the novel teachings disclosed herein. Accordingly, the scope of this invention is intended to be limited only as defined in the appended claims and equivalents thereof.

I claim:

1. A device for adjusting the inclination of a lamp member with respect to a support member for the lamp members comprising eccentric means locatable between the members, and connecting means attached to the eccentric means for joining the eccentric means on one side thereof to the lamp member and on the other side thereof to the support member, said eccentric means being rotatable to vary the distance between the lamp member and said support member when said connecting means is joined to said members.

2. A device for adjusting the inclination of a lamp member with respect to a support member for the lamp member comprising eccentric means locatable between the members, and connecting means attached to the eccentric means for joining the eccentric means on one side thereof to the lamp member and on the other side thereof to the support member, said eccentric means being rotatable to vary the distance between the lamp member and said support member when said connecting means is joined to said members, said eccentric means including a sheave, shaft means eccentrically located on said sheave and extending laterally therefrom, said connecting means comprising a first connector journalled at one end on said shaft means and adapted to be connected at the other end to one of said members, and a second connector journalled at one end on said sheave and adapted to be connected at the other end to the other member.

3. A device as set forth in claim 2 wherein said connectors comprise wires.

4. A device as set forth in claim 2 wherein said shaft means extend laterally from opposite sides of said sheave, said first connector comprising a generally U-shaped wire the outer ends of which are located on opposite sides of said sheave and surround said shaft means.

5. A device as set forth in claim 4 wherein said second connector comprises a wire, and said one end said second connector surrounds said sheave.

6. A device for adjusting the inclination of an automotive headlamp with respect to a support for the headlamp comprising eccentric means locatable between said headlamp and said support, and connecting means for joining the eccentric means on one side thereof to the support and on the other side thereof to the headlamp, said connecting means comprising wire members each of which is journalled on one end to said eccentric means, and said wire members being connectable on their other ends to said support and said headlamp.

7. A device as set forth in claim 6 wherein said eccentric means comprises a sheave on which one end of one of said wire members is journalled, and eccentrically located shaft means extending laterally from said sheave and on which one end of another of said wire members is journalled.

8. A device for adjusting the inclination of a lamp member with respect to a support member for the lamp member comprising eccentric means locatable between the members, and connecting means attached to the eccentric means for joining the eccentric means on one side thereof to the lamp member and on the other side thereof to the support member, said eccentric means being rotatable to vary the distance between the lamp member and said support member when said connecting means is joined to said members, said eccentric means comprising a sheave having eccentrically located shaft portions extending laterally therefrom, said connecting means comprising a first generally U-shaped wire having its outer ends wrapped around and frictionally engaging said shaft portions, the bottom of the U of said wire being adapted for connection to one of said members, and a second wire having one end wrapped around said sheave and the other end being adapted for connection to the other member.

References Cited

UNITED STATES PATENTS

| | | | |
|---|---|---|---|
| 2,565,327 | 8/1951 | Shaw | 248—27 XR |
| 2,911,524 | 11/1959 | Falge et al. | 240—41.6 |
| 3,062,489 | 11/1962 | Zook | 248—27 |

JOHN PETO, *Primary Examiner.*

ROY D. FRAZIER, *Examiner.*